UNITED STATES PATENT OFFICE.

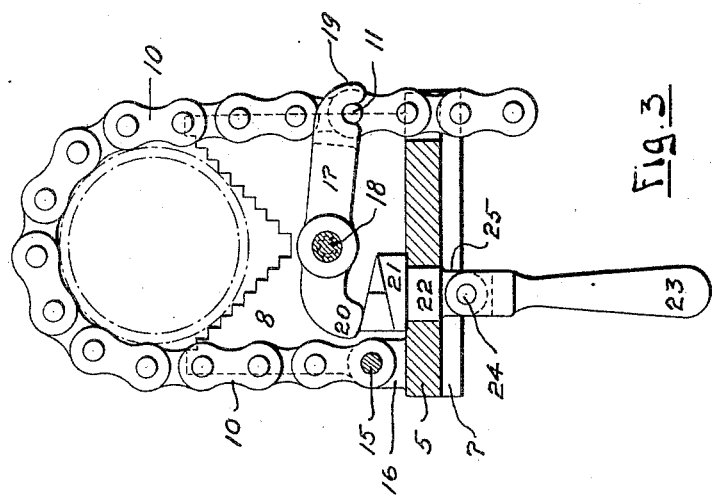
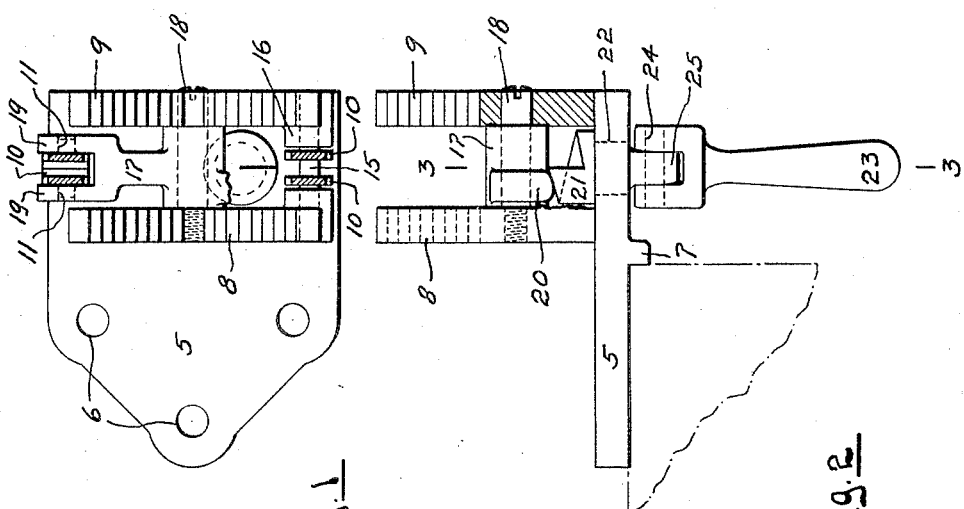

FRANK W. HEDDEN, OF JERSEY CITY, NEW JERSEY.

PIPE-VISE.

1,081,279.  Specification of Letters Patent.  Patented Dec. 9, 1913.

Application filed May 14, 1912. Serial No. 697,179.

*To all whom it may concern:*

Be it known that I, FRANK W. HEDDEN, a citizen of the United States, and resident of Jersey City, in the county of Hudson and State of New Jersey, have invented certain new and useful Improvements in Pipe-Vises, of which the following is a specification.

This invention relates to pipe vises and the like.

One of its objects is the production of an improved vise that will quickly and securely grip or release a pipe upon which work is being performed.

Another object is to produce a pipe vise of simplified construction.

A further object is to provide a strong and convenient pipe vise at low cost production.

A still further object is a pipe vise wherein the parts subject to wear may be readily discarded and new parts substituted at slight expense.

Pipe vises heretofore have depended upon screw actuation for clamping or releasing the pipe held therein, which construction naturally resulted in slow moving and time wasting devices. Besides they have been inexpedient on account that the operator had to pay close attention to the adjustment of the threaded screw shank to which the gripping chain is ordinarily attached, with relation to its operating nut or sleeve, so that the latter would not engage too many of the screw threads and ride up on the shank thus limiting the clamping movement. On the other hand if too few of the screw threads on the shank were in engagement with the operating nut there would be excessive wear and even danger of stripping the threads.

By the design of the present invention a quick acting pipe vise avoiding the hereinbefore mentioned objections is produced. In the device under consideration the operating screw has been dispensed with and in its stead a simple lever having its forked end adapted to take over the projecting link pins of the gripping chain is pivoted out of the way between the jaws of the vise. A cam journaled in the base of the vise between the jaws thereof, bears against the other end of this lever, causing the latter to draw the chain up tight, when it is rotated. Further, the gripping chain is positively fixed to the vise so that no matter how the latter is handled, it cannot become detached and lost.

In the drawing hereto annexed: Figure 1 is a plan view of the invention, parts being broken away. Fig. 2 is a front view of Fig. 1, parts being shown in section, and Fig. 3 is a partial section on the line 3—3 of Fig. 2.

In these views the numeral 5 represents the base of the device, which is provided with holes 6 for the reception of bolts adapted to hold it to a bench or other primary support. A ledge 7 depending from the underside of the base alines the latter in position against the edge of the work bench. From the overhung portion of the base 5 extend a pair of toothed or serrated jaws 8 and 9. Coöperating therewith to hold the pipe (shown by dash-and-dot lines in Fig. 3) is a chain 10 having sidewise projecting link pins 11. The before-mentioned elements constitute the standard or conventional parts of the regular pipe vise. The said chain 10 is positively fixed to the vise as by means of a hinge pin 15 which is received in ears 16 projecting inwardly between the jaws 8, 9. Similarly located between these jaws is a lever 17 pivoted on a stud 18. This stud may be threaded into one and have a clearance hole in the other jaw, as shown. One end of the said lever 17 is bifurcated as at 19 so as to take over the sidewise projecting pins 11 of the chain. The other extremity of the lever 17 is formed with an offset nose portion preferably bent as shown at 20. Against this end of the lever bears a solid-faced cam 21 having a single helical step, the shank 22 of which cam is preferably journaled in the base 5 between the jaws thereof and operates in a plane at substantially right angles to the axis of the pivot bolt 17. An operating handle 23 is hinged at 24 to an ear 25 formed integral with the said shank 22.

In using the device, the operator guides the chain 10 over the pipe and causes the bifurcated end of the lever 17 to engage the highest link pin that it can reach, while the opposite end of the lever rides upon the lowest part of the cam 21. Next the handle 23 is swung substantially horizontal to obtain the greatest leverage and then turned to forcibly advance the higher portion of the cam surface against the end 20 of the lever, thereby causing the bifurcated end 19 of the lever to pull the chain tight so as to securely grip the pipe for cutting or threading. To release the pipe, the handle 23 is moved in the opposite direction by virtue of which the chain becomes slack and can be detached from the lever.

Having described my invention what I desire to secure by Letters Patent and claim is:—

1. In a pipe vise and the like, the combination with a pipe holding jaw and a co-operating chain suitable to embrace pipes of various sizes, of a lever adapted to engage said chain at one end, a solid faced cam bearing against said lever to draw the chain by its other end for gripping pipes, and means for rotating said cam from the side opposite the solid face.

2. In a pipe vise and the like, the combination with a base having spaced holding jaws, and a chain coacting therewith to include pipes of different sizes, of a pivot bolt bridging the space between said jaws, a lever journaled on said bolt bearing against said chain, a solid faced cam actuating said lever for gripping pipes, and a handle for operating said cam in a plane at right angles to the axis of said bolt.

3. In a pipe vise and the like, the combination with a base having pipe holding jaws, and a pipe engaging chain thereover having link-pins, of a lever pivotally supported between said jaws and having one end engaging said chain, a solid faced cam having a single helical step journaled with its face upward in the top of said base, the other end of said lever bearing fully and acting directly against the upper face of said cam, said cam being capable by a partial rotation of exerting a thrust against the lever sufficient to draw the chain the distance between its adjacent link-pins whereby pipes of various sizes placed in the jaws are gripped.

4. In a pipe vise and the like, the combination with a support, pipe holding jaws thereon and a flexible clamping member for coöperation with pipes of various sizes, of a lever operatively maintained between said jaws adapted to engage the flexible clamping member, a cam coacting with said lever, and a handle to operate said cam whereby the latter causes the lever to pull said flexible member for gripping pipes.

5. In a pipe vise and the like, the combination with a body part, pipe holding jaws extending therefrom and a chain co-acting with said jaws to include pipes of various sizes, of a lever between the jaws fulcrumed intermediate its ends, one end of said lever being adapted to engage a link in the chain, a cam pressing against the opposite end of said lever and means for actuating said cam to force the lever to draw the chain into clamping position.

6. In a pipe vise and the like, the combination with a support having pipe holding jaws thereon and a chain anchored at one end near said support, being adapted to embrace pipes of various sizes, of a lever fulcrumed between the pipe jaws having one end adapted for engagement with said chain, a cam pressing against the opposite end of said lever, being journaled in the support, having one end passing therethrough, and a handle pivoted below the support to the end of said cam, whereby the latter is actuated to force the lever to draw said chain for gripping pipes.

7. In a pipe vise and the like, the combination with a base including jaws thereon, a chain coöperating with the jaws to hold pipes therein, and a pin passing through and positively anchoring one end of the chain to and between said jaws, of a lever pivoted between the jaws to one side of said pin, having one end adapted to engage the link pins of said chain, and means journaled in said base, acting against the free end of said lever so as to cause it to draw the loose end of the chain for clamping pipes.

8. A pipe vise or the like, comprising a base, a plurality of jaws substantially parallel thereon, a lever having an offset end fulcrumed above said base, a chain anchored to the base adapted to be thrown over the work on the jaws and engaged by said lever, a solid faced cam journaled in said base below the offset end of said lever operating against the latter so as to swing it and thereby draw the chain onto the work, and means for actuating said cam from under the base.

Signed at the borough of Manhattan in the county of New York and State of New York this 13th day of May A. D. 1912.

FRANK W. HEDDEN.

Witnesses:
H. C. KARLSON,
W. H. GEE.

---

Copies of this patent may be obtained for five cents each, by addressing the "Commissioner of Patents, Washington, D. C."